(12) United States Patent
Jha et al.

(10) Patent No.: US 8,995,444 B2
(45) Date of Patent: *Mar. 31, 2015

(54) METHOD AND SYSTEM FOR EXTENDING ROUTING DOMAIN TO NON-ROUTING END STATIONS

(71) Applicant: Brocade Communications Systems, Inc., San Jose, CA (US)

(72) Inventors: Pankaj K. Jha, Fremont, CA (US); Mitri Halabi, San Jose, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 13/758,902

(22) Filed: Feb. 4, 2013

(65) Prior Publication Data

US 2013/0148491 A1   Jun. 13, 2013

Related U.S. Application Data

(63) Continuation of application No. 12/730,749, filed on Mar. 24, 2010, now Pat. No. 8,369,335.

(51) Int. Cl.
*H04L 12/733* (2013.01)
*H04L 12/721* (2013.01)
*H04L 12/931* (2013.01)

(52) U.S. Cl.
CPC ............ *H04L 45/20* (2013.01); *H04L 45/66* (2013.01); *H04L 49/351* (2013.01); *H04L 49/70* (2013.01)
USPC .......................................................... 370/392

(58) Field of Classification Search
None
See application file for complete search history.

(56) References Cited

U.S. PATENT DOCUMENTS

| | | | |
|---|---|---|---|
| 5,390,173 A | 2/1995 | Spinney |
| 5,802,278 A | 9/1998 | Isfeld |
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,241 B1 | 2/2001 | Sun |
| 6,438,106 B1 | 8/2002 | Pillar |
| 6,542,266 B1 | 4/2003 | Phillips |

(Continued)

FOREIGN PATENT DOCUMENTS

| | | |
|---|---|---|
| CN | 102801599 A | 11/2012 |
| EP | 1916807 A2 | 4/2008 |

(Continued)

OTHER PUBLICATIONS

"Switched Virtual Internetworking moved beyond bridges and routers", 8178 Data Communications Sep. 23, 1994, No. 12, New York.

(Continued)

*Primary Examiner* — Chirag Shah
*Assistant Examiner* — Amar Persaud
(74) *Attorney, Agent, or Firm* — Shun Yao; Park, Vaughan, Fleming & Dowler LLP

(57) ABSTRACT

A system is provided for facilitating assignment of a virtual routing node identifier to a non-routing node. During operation, the system assigns to a non-routing node coupled to a switch a virtual routing node identifier unique to the non-routing node. In addition, the system communicates reachability information corresponding to the virtual routing node identifier to other switches in the network.

15 Claims, 8 Drawing Sheets

(56) References Cited

U.S. PATENT DOCUMENTS

| | | |
|---|---|---|
| 6,633,761 B1 | 10/2003 | Singhal |
| 6,873,602 B1 | 3/2005 | Ambe |
| 6,975,581 B1 | 12/2005 | Medina |
| 6,975,864 B2 | 12/2005 | Singhal |
| 7,016,352 B1 | 3/2006 | Chow |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,330,897 B2 | 2/2008 | Baldwin |
| 7,380,025 B1 | 5/2008 | Riggins |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,960 B1 | 3/2010 | Aubuchon |
| 7,690,040 B2 | 3/2010 | Frattura |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shukla |
| 8,078,704 B2 | 12/2011 | Lee |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,301,686 B1 | 10/2012 | Appajodu |
| 8,351,352 B1 | 1/2013 | Eastlake, III |
| 8,369,347 B2 | 2/2013 | Xiong |
| 8,392,496 B2 | 3/2013 | Linden |
| 8,462,774 B2 | 6/2013 | Page |
| 8,520,595 B2 | 8/2013 | Yadav |
| 8,599,850 B2 | 12/2013 | Jha |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2004/0001433 A1 | 1/2004 | Gram |
| 2004/0010600 A1 | 1/2004 | Baldwin |
| 2004/0117508 A1 | 6/2004 | Shimizu |
| 2004/0120326 A1 | 6/2004 | Yoon |
| 2004/0165595 A1 | 8/2004 | Holmgren |
| 2004/0213232 A1 | 10/2004 | Regan |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0169188 A1 | 8/2005 | Cometto |
| 2005/0213561 A1 | 9/2005 | Yao |
| 2005/0265356 A1 | 12/2005 | Kawarai |
| 2005/0278565 A1 | 12/2005 | Frattura |
| 2006/0018302 A1 | 1/2006 | Ivaldi |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0184937 A1 | 8/2006 | Abels |
| 2006/0242311 A1 | 10/2006 | Mai |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2007/0036178 A1 | 2/2007 | Hares |
| 2007/0097968 A1 | 5/2007 | Du |
| 2007/0116224 A1 | 5/2007 | Burke |
| 2007/0177597 A1 | 8/2007 | Ju |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0101386 A1 | 5/2008 | Gray |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0205377 A1 | 8/2008 | Chao |
| 2008/0219172 A1 | 9/2008 | Mohan |
| 2008/0240129 A1 | 10/2008 | Elmeleegy |
| 2008/0267179 A1 | 10/2008 | LaVigne |
| 2008/0285555 A1 | 11/2008 | Ogasahara |
| 2009/0037607 A1 | 2/2009 | Farinacci |
| 2009/0044270 A1 | 2/2009 | Shelly |
| 2009/0067422 A1 | 3/2009 | Poppe |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0106405 A1 | 4/2009 | Mazarick |
| 2009/0116381 A1 | 5/2009 | Kanda |
| 2009/0138752 A1 | 5/2009 | Graham |
| 2009/0199177 A1 | 8/2009 | Edwards |
| 2009/0204965 A1 | 8/2009 | Tanaka |
| 2009/0222879 A1 | 9/2009 | Kostal |
| 2009/0245137 A1 | 10/2009 | Hares |
| 2009/0245242 A1 | 10/2009 | Carlson |
| 2009/0260083 A1 | 10/2009 | Szeto |
| 2009/0323708 A1* | 12/2009 | Ihle et al. .............. 370/402 |
| 2009/0327392 A1 | 12/2009 | Tripathi |
| 2009/0327462 A1 | 12/2009 | Adams |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1* | 4/2010 | Allan et al. .............. 370/218 |
| 2010/0103939 A1 | 4/2010 | Carlson |
| 2010/0131636 A1 | 5/2010 | Suri |
| 2010/0165877 A1 | 7/2010 | Shukla |
| 2010/0165995 A1 | 7/2010 | Mehta |
| 2010/0169467 A1 | 7/2010 | Shukla |
| 2010/0169948 A1 | 7/2010 | Budko |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0303071 A1 | 12/2010 | Kotalwar |
| 2010/0303075 A1 | 12/2010 | Tripathi |

(56) References Cited

U.S. PATENT DOCUMENTS

| | | |
|---|---|---|
| 2010/0303083 A1 | 12/2010 | Belanger |
| 2010/0309820 A1 | 12/2010 | Rajagopalan |
| 2011/0019678 A1* | 1/2011 | Mehta et al. ............... 370/401 |
| 2011/0035498 A1 | 2/2011 | Shah |
| 2011/0044339 A1 | 2/2011 | Kotalwar |
| 2011/0064086 A1 | 3/2011 | Xiong |
| 2011/0072208 A1 | 3/2011 | Gulati |
| 2011/0085560 A1 | 4/2011 | Chawla |
| 2011/0085563 A1 | 4/2011 | Kotha |
| 2011/0134802 A1 | 6/2011 | Rajagopalan |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161695 A1 | 6/2011 | Okita |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231574 A1 | 9/2011 | Saunderson et al. |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0274114 A1 | 11/2011 | Dhar |
| 2011/0286457 A1 | 11/2011 | Ee |
| 2011/0296052 A1 | 12/2011 | Guo |
| 2011/0299391 A1 | 12/2011 | Vobbilisetty |
| 2011/0299532 A1 | 12/2011 | Yu |
| 2012/0011240 A1 | 1/2012 | Hara |
| 2012/0014261 A1 | 1/2012 | Salam |
| 2012/0014387 A1 | 1/2012 | Dunbar |
| 2012/0027017 A1 | 2/2012 | Rai |
| 2012/0033663 A1 | 2/2012 | Guichard |
| 2012/0033665 A1 | 2/2012 | Da Silva |
| 2012/0099602 A1 | 4/2012 | Nagapudi |
| 2012/0106339 A1 | 5/2012 | Mishra et al. |
| 2012/0131097 A1 | 5/2012 | Baykal |
| 2012/0131289 A1 | 5/2012 | Taguchi et al. |
| 2012/0177039 A1 | 7/2012 | Berman |
| 2012/0243539 A1 | 9/2012 | Keesara |
| 2012/0294192 A1 | 11/2012 | Masood |
| 2012/0320800 A1 | 12/2012 | Kamble |
| 2013/0034015 A1 | 2/2013 | Jaiswal |
| 2013/0067466 A1 | 3/2013 | Combs |
| 2013/0259037 A1 | 10/2013 | Hari |
| 2014/0105034 A1 | 4/2014 | Sun |

FOREIGN PATENT DOCUMENTS

| | | |
|---|---|---|
| EP | 2001167 A1 | 12/2008 |
| WO | 2010111142 A1 | 9/2010 |

OTHER PUBLICATIONS

S. Night et al., "Virtual Router Redundancy Protocol", Network Working Group, XP-002135272, Apr. 1998.
Eastlake 3rd., Donald et al., "RBridges: TRILL Header Options", Draft-ietf-trill-rbridge-options-00.txt, Dec. 24, 2009.
J. Touch, et al., "Transparent Interconnection of Lots of Links (TRILL): Problem and Applicability Statement", May 2009.
Perlman, Radia et al., "RBridge VLAN Mapping", Draft-ietf-trill-rbridge-vlan-mapping-01.txt, Dec. 4, 2009.
Brocade Fabric OS (FOS) 6.2 Virtual Fabrics Feature Frequently Asked Questions.
Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", draft-ietf-trill-rbridge-protocol-16.txt, Mar. 3, 2010.
Christensen, M. et al., "Considerations for Internet Group Management Protocol (IGMP) and Multicast Listener Discovery (MLD) Snooping Switches", May 2006.
Lapuh, Roger et al., "Split Multi-link Trunking (SMLT)", Oct. 2002.
Lapuh, Roger et al., "Split Multi-link Trunking (SMLT) draft-lapuh-network-smlt-08", 2008.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Apr. 22, 2014, U.S. Appl. No. 13/030,806, filed Feb. 18, 2011.
Office Action dated Jun. 20, 2014, U.S. Appl. No. 13/092,877, filed Apr. 22, 2011.
Office Action dated Apr. 9, 2014, U.S. Appl. No. 13/092,752, filed Apr. 22, 2011.
Office Action dated Mar. 26, 2014, U.S. Appl. No. 13/092,701, filed Apr. 22, 2011.
Office Action dated Mar. 14, 2014, U.S. Appl. No. 13/092,460, filed Apr. 22, 2011.
Office Action dated Apr. 9, 2014, U.S. Appl. No. 13/092,724, filed Apr. 22, 2011.
Office Action for U.S. Appl. No. 13/533,843, filed Jun. 26, 2012, dated Oct. 21, 2013.
Office Action for U.S. Appl. No. 13/044,326, filed Mar. 9, 2011, dated Oct. 2, 2013.
Office Action for U.S. Appl. No. 13/312,903, filed Dec. 6, 2011, dated Nov. 12, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/092,877, filed Apr. 22, 2011, dated Jan. 6, 2014.
U.S. Appl. No. 12/312,903 Office Action dated Jun. 13, 2013.
U.S. Appl. No. 13/365,808 Office Action dated Jul. 18, 2013.
U.S. Appl. No. 13/365,993 Office Action dated Jul. 23, 2013.
U.S. Appl. No. 13/092,873 Office Action dated Jun. 19, 2013.
U.S. Appl. No. 13/184,526 Office Action dated May 22, 2013.
U.S. Appl. No. 13/184,526 Office Action dated Jan. 28, 2013.
U.S. Appl. No. 13/050,102 Office Action dated May 16, 2013.
U.S. Appl. No. 13/050,102 Office Action dated Oct. 26, 2012.
U.S. Appl. No. 13/044,301 Office Action dated Feb. 22, 2013.
U.S. Appl. No. 13/044,301 Office Action dated Jun. 11, 2013.
U.S. Appl. No. 13/030,688 Office Action dated Apr. 25, 2013.
U.S. Appl. No. 13/030,806 Office Action dated Dec. 3, 2012.
U.S. Appl. No. 13/030,806 Office Action dated Jun. 11, 2013.
U.S. Appl. No. 13/098,360 Office Action dated May 31, 2013.
U.S. Appl. No. 13/092,864 Office Action dated Sep. 19, 2012.
U.S. Appl. No. 12/950,968 Office Action dated Jun. 7, 2012.
U.S. Appl. No. 12/950,968 Office Action dated Jan. 4, 2013.
U.S. Appl. No. 13/092,877 Office Action dated Mar. 4, 2013.
U.S. Appl. No. 12/950,974 Office Action dated Dec. 20, 2012.
U.S. Appl. No. 12/950,974 Office Action dated May 24, 2012.
U.S. Appl. No. 13/092,752 Office Action dated Feb. 5, 2013.

(56) References Cited

OTHER PUBLICATIONS

U.S. Appl. No. 13/092,752 Office Action dated Jul. 18, 2013.
U.S. Appl. No. 13/092,701 Office Action dated Jan. 28, 2013.
U.S. Appl. No. 13/092,701 Office Action dated Jul. 3, 2013.
U.S. Appl. No. 13/092,460 Office Action dated Jun. 21, 2013
U.S. Appl. No. 13/042,259 Office Action dated Mar. 18, 2013.
U.S. Appl. No. 13/042,259 Office Action dated Jul. 31, 2013.
U.S. Appl. No. 13/092,580 Office Action dated Jun. 10, 2013.
U.S. Appl. No. 13/092,724 Office Action dated Jul. 16, 2013.
U.S. Appl. No. 13/092,724 Office Action dated Feb. 5, 2013.
U.S. Appl. No. 13/098,490 Office Action dated Dec. 21, 2012.
U.S. Appl. No. 13/098,490 Office Action dated Jul. 9, 2013.
U.S. Appl. No. 13/087,239 Office Action dated May 22, 2013.
U.S. Appl. No. 13/087,239 Office Action dated Dec. 5, 2012.
U.S. Appl. No. 12/725,249 Office Action dated Apr. 26, 2013.
U.S. Appl. No. 12/725,249 Office Action dated Sep. 12, 2012.
Office Action for U.S. Appl. No. 13/092,887, dated Jan. 6, 2014.
Brocade Unveils "The Effortless Network", http://newsroom.brocade.com/press-releases/brocade-unveils-the-effortless-network—nasdaq-brcd-0859535, 2012.
Foundry FastIron Configuration Guide, Software Release FSX 04.2.00b, Software Release FWS 04.3.00, Software Release FGS 05.0.00a, Sep. 26, 2008.
FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STK, FCX 06.0.00 for FCX; and TIX 04.1.00 for TI24X, Feb. 16, 2010.
FastIron Configuration Guide Supporting Ironware Software Release 07.0.00, Dec. 18, 2009.
"The Effortless Network: HyperEdge Technology for the Campus LAN", 2012.
Narten, T. et al. "Problem Statement: Overlays for Network Virtualization", draft-narten-nvo3-overlay-problem-statement-01, Oct. 31, 2011.
Knight, Paul et al., "Layer 2 and 3 Virtual Private Networks: Taxonomy, Technology, and Standardization Efforts", IEEE Communications Magazine, Jun. 2004.
"An Introduction to Brocade VCS Fabric Technology", Brocade white paper, http://community.brocade.com/docs/Doc-2954, Dec. 3, 2012.
Kreeger, L. et al., "Network Virtualization Overlay Control Protocol Requirements", Draft-kreeger-nvo3-overlaycp-00, Jan. 30, 2012.
Knight, Paul et al., "Network based IP VPN Architecture using Virtual Routers", May 2003.
Louati, Wajdi et al., "Network-based virtual personal overlay networks using programmable virtual routers", IEEE Communications Magazine, Jul. 2005.
U.S. Appl. No. 13/092,877 Office Action dated Sep. 5, 2013.
U.S. Appl. No. 13/044,326 Office Action dated Oct. 2, 2013.

\* cited by examiner

METHOD AND SYSTEM FOR EXTENDING ROUTING DOMAIN TO NON-ROUTING END STATIONS

RELATED APPLICATION

This application is a continuation application of application Ser. No. 12/730,749, entitled "METHOD AND SYSTEM FOR EXTENDING ROUTING DOMAIN TO NON-ROUTING END STATIONS," by inventors Pankaj K. Jha and Mitri Halabi, filed 24 Mar. 2010, the disclosure of which is incorporated by reference herein.

BACKGROUND

1. Field

The present disclosure relates to network management. More specifically, the present disclosure relates to a method and system for extending the routing domain in a network to a non-routing node.

2. Related Art

Currently, end stations in layer-2 networks have not been able to take advantage of the routing functionalities available in such networks. End stations can only operate as leaf nodes and are constrained to an interface with only one of the routing nodes. Consequently, an end station is required to exchange all the data with that node, and there is no node redundancy (e.g., for protection against routing node failures) available to end stations. Furthermore, other routing nodes in the network can send data to that end station only via one routing switch to which the end station is connected.

Meanwhile, layer-2 networking technologies continue to evolve. More routing functionalities, which have traditionally been the characteristics of layer-3 (e.g., IP) networks, are migrating into layer-2. Notably, the recent development of the Transparent Interconnection of Lots of Links (TRILL) protocol allows Ethernet switches to function more like routing nodes. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

However, a switch or end host not running the TRILL protocol cannot benefit from the rich set of functionalities provided in TRILL networks.

SUMMARY

One embodiment of the present invention provides a system for facilitating assignment of a virtual routing node identifier to a non-routing node. During operation, the system assigns to a non-routing node coupled to a switch a virtual routing node identifier unique to the non-routing node. In addition, the system communicates reachability information corresponding to the virtual routing node identifier to other switches in the network.

In a variation on this embodiment, the switch is a routing bridge capable of routing data frames without requiring the network topology to be a spanning tree topology.

In a variation on this embodiment, the virtual routing node identifier is a routing bridge identifier in accordance with the Transparent Interconnection of Lots of Links (TRILL) protocol.

In a variation on this embodiment, the system performs a routing function based on an intermediate system to intermediate system (IS-IS) routing protocol. The system further advertises reachability associated with the virtual routing node identifier in IS-IS link state protocol data units.

In a variation on this embodiment, the system marks an ingress-switch field of a frame received from the non-routing node with the virtual routing node identifier.

In a variation on this embodiment, the non-routing node is also coupled to at least a second routing switch capable of performing a routing function. The first routing switch communicates to the second routing switch and optionally other routing switches the media access control (MAC) address(es) learned from a port to which the none-routing node is coupled.

In a variation on this embodiment, in response to detecting a failure of a link between the non-routing node and the switch, the system discontinues communicating the reachability information to other switches and/or provides an explicit message to inform other switch(es) about the non-reachability to the non-routing node.

In a variation on this embodiment, the system is precluded from forwarding a multi-destination frame to the non-routing node when an ingress-switch field of the frame matches the virtual routing node identifier assigned to the non-routing node.

DETAILED DESCRIPTION

Figure 1A:
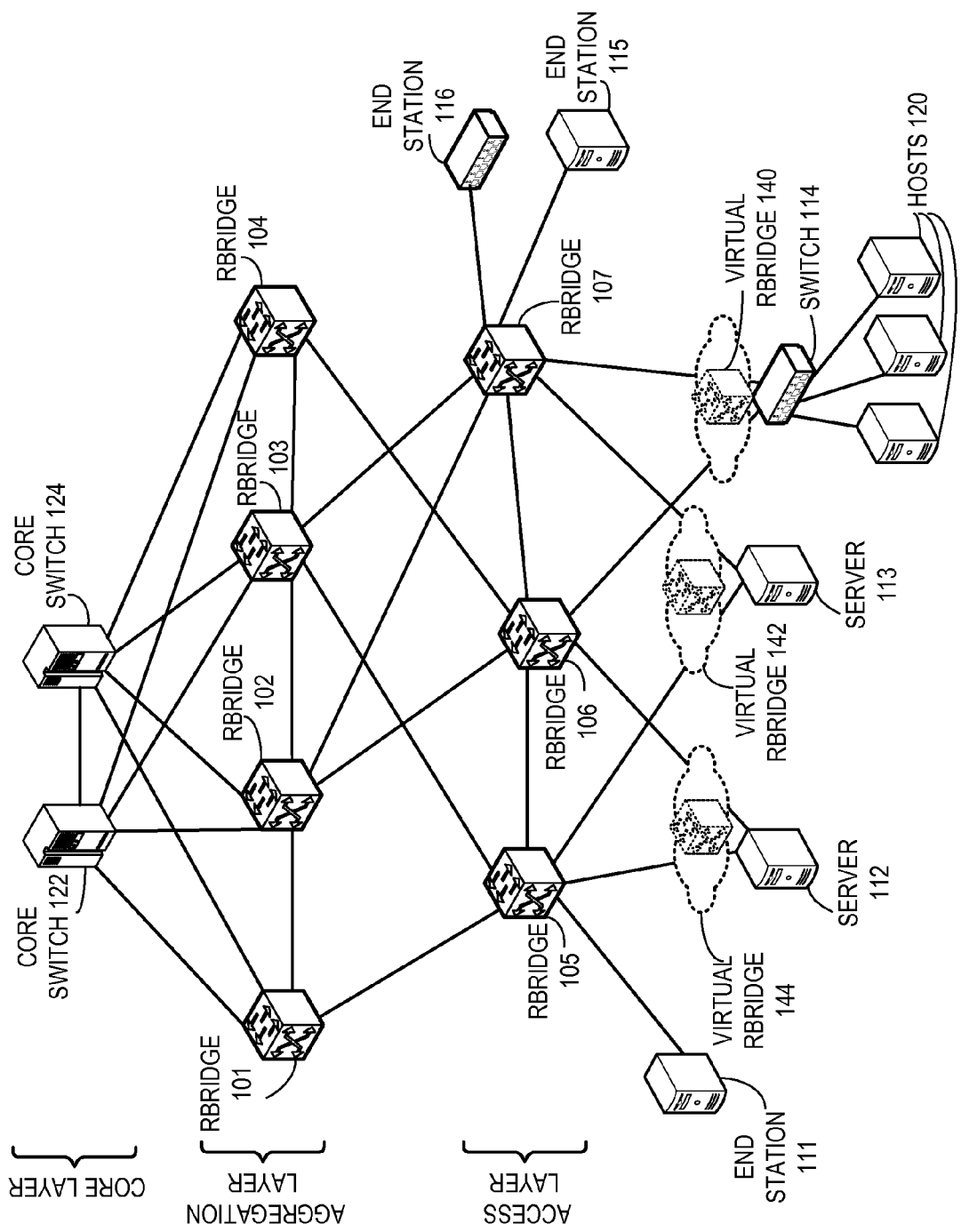
FIG. 1A illustrates an exemplary network where virtual RBridge identifiers are assigned to non-TRILL nodes, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of extending a layer-2 routing domain to a non-routing node is solved by assigning a virtual routing node identifier to the non-routing node. The neighbor routing node(s) of the non-routing node can then advertise the connectivity to the non-routing node as if the non-routing node were part of the routed network.

For example, in a layer-2 network running the TRILL protocol, when an end station which does not participate in the TRILL network is coupled to one or more routing bridges (RBridges), a virtual TRILL RBridge identifier is assigned to this end station. The end station is then considered to be a virtual RBridge capable of running the TRILL protocol. An incoming frame from the end station is marked by the ingress physical RBridge with a virtual RBridge nickname as its ingress RBridge nickname and routed through the rest of the TRILL network. An end station can be coupled to multiple physical RBridges and have the same virtual RBridge ID. Consequently, other RBridges in the TRILL network can use multiple paths to reach this end station using its virtual RBridge ID, because to the rest of the TRILL network, this end station appears to be just like any other RBridge in the network. The assignment of a virtual RBridge identifier allows a non-TRILL-capable end station to participate in the routing domain of a TRILL network, and to be coupled to multiple RBridges in an arbitrary topology. Such configuration provides tremendous flexibility and facilitates redundancy against both link and node failures. For instance, an end station with a virtual RBridge identifier can be coupled to two or more physical RBridges using link aggregation. The physical RBridges can advertise connectivity to the virtual RBridge to their neighbor RBridges. When one of the aggregated links fails, the affected end station can continue operating via the remaining link(s). For the rest of the TRILL network, the virtual RBridge remains reachable.

Although this disclosure is presented using examples based on the TRILL protocol, embodiments of the present invention are not limited to TRILL networks, or networks defined in a particular Open System Interconnection Reference Model (OSI reference model) layer. In particular, although the term "layer-2" is mentioned several times in the examples, embodiments of the present invention are not limited to application to layer-2 networks. Other networking environment, either defined in OSI layers or not defined with a particular layering model, can also use the disclosed embodiments. For instance, these embodiments can apply to Multiprotocol Label Switching (MPLS) networks as well as Storage Area Networks (e.g., Fibre Channel networks).

Furthermore, although intermediate-system-to-intermediate-system (IS-IS) routing protocol is used in the examples, embodiments of the present invention are not limited to a particular routing protocol. Other routing protocols, such as Open Shortest Path First (OSPF), Routing Information Protocol (RIP), Interior Gateway Routing Protocol (IGRP), Enhanced IGRP (EIGRP), Border Gateway Protocol (BGP), or other open or proprietary protocols can also be used. In addition, embodiments of the present invention are not limited to the TRILL frame encapsulation format. Other open or proprietary encapsulation format and methods can also be used.

The term "RBridge" refers to routing bridges, which are bridges implementing the TRILL protocol as described in IETF draft "RBridges: Base Protocol Specification," available at http://tools.ietf.org/html/draft-ietf-trill-rbridge-protocol-14, which is incorporated by reference herein. Embodiments of the present invention are not limited to the application among RBridges. Other types of switches, routers, and forwarders can also be used.

The term "physical RBridge" refers to an RBridge running TRILL protocol, as opposed to a "virtual RBridge" which refers to a non-TRILL end station with a virtual RBridge ID.

The term "virtual RBridge" refers to a non-TRILL end station with a virtual RBridge ID. The physical RBridge(s) to which the non-TRILL end station is coupled can advertise the connectivity to this end station as if it were a regular RBridge.

The term "end station" refers to a network device that is not TRILL-capable. "End station" is a relative term with respect to the TRILL network. "End station" does not necessarily mean that the network device is an end host. An end station can be a host, a conventional layer-2 switch, or any other type of network device. Additionally, an end station can be coupled to other switches, routers, or hosts further away from the TRILL network. In other words, an end station can be an aggregation point for a number of network devices to enter the TRILL network.

The term "multi-homed end station" refers to an end station that has an aggregate link to two or more TRILL RBridges, where the aggregate link includes multiple physical links to the different RBridges. The aggregate link functions as one logical link to the end station. "Multi-homed end station" may also refer to an end station that connects to TRILL RBridges which do not form a logical link aggregation and do not form an association with each other. This could be the case where an end station has multiple logical networking entities (an example is a virtualized server where different servers may be coupled to different networks through different network ports in the system). A single end-station can have multiple virtual RBridge identifier assignments.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "RBridge identifier" refers to a group of bits that can be used to identify an RBridge. Note that the TRILL standard uses "RBridge ID" to denote the 48-bit intermediate-system-to-intermediate-system (IS-IS) System ID assigned to an RBridge, and "RBridge nickname" to denote the 16-bit value that serves as an abbreviations for the "RBridge ID." The "RBridge identifier" used in this disclosure is not limited to any bit format, and can refer to "RBridge ID" or "RBridge nickname" or any other format that can identify an RBridge.

Network Architecture

FIG. 1A illustrates an exemplary network where virtual RBridge identifiers are assigned to non-TRILL nodes, in accordance with an embodiment of the present invention. In this example, the network is divided into three layers: a core layer, an aggregation layer, and an access layer. The core layer includes core switches 122 and 124. These switches can be director-class high-throughput switches interconnecting multiple networks. The aggregation layer includes a number of RBridges 101, 102, 103, and 104. These RBridges facilitate traffic aggregation from the access layer and feed to the core layer. The access layer also includes a number of RBridges 105, 106, and 107. The RBridges in the access layer interface with end stations, such as end stations 111, 112, 113, 114, 115, and 116. RBridges 101, 102, 103, 104, 105, 106, and 107 form the TRILL network. An end station can be a host, a switch, or any type of network device. For example, end stations 112 and 113 are both servers, and end station 114 is a switch. Furthermore, the TRILL network can be configured in any arbitrary topology, which can be a mesh and not required to be a spanning tree topology.

In embodiments of the present invention, an end station is assigned a virtual RBridge ID. This configuration allows the end station to be part of the routed TRILL network, and hence take advantage of the topology flexibility. For example, as illustrated in FIG. 1A, servers 112 and 113, and switch 114 are all multi-homed with two physical RBridges. Server 112 is coupled to RBridges 105 and 106; server 113 is coupled to RBridges 105 and 107; and switch 114 is coupled to RBridges 106 and 107. Furthermore, switch 114 is also an aggregation point for hosts 120. Servers 112 and 113, as well as switch 114, each can be assigned a virtual RBridge ID.

Assume that end stations 112, 113, and 114 are assigned respective virtual RBridge IDs. Their neighbor RBridges broadcast their connectivity as virtual RBridges 144, 142, and 140, respectively. As a result, the rest of the TRILL network can view these end stations just like any other RBridge and route traffic toward them via any available path.

Take switch 114 for example. Without virtual RBridge identifier assignment, switch 114 would be "transparent" to the rest of the TRILL network. The frames forwarded by switch 114 to the TRILL network are native Ethernet frames from hosts 120. An RBridge in the TRILL network would associate the Media Access Control (MAC) addresses for hosts 120 with an ingress RBridge (i.e., the first RBridge in the TRILL network that receives these Ethernet frames).

In addition, without virtual RBridge identifier assignment, the multi-homing-style connectivity would not provide the desired result, because the TRILL protocol depends on MAC address learning to determine the location of end stations (i.e., to which ingress RBridge an end station is coupled) based on a frame's ingress TRILL RBridge ID. As such, an end station can only appear to be reachable via a single physical RBridge. For example, assume that end station 111 is in communication with one of the hosts 120. Since switch 114 is coupled to RBridges 106 and 107, the ingress RBridge would be RBridges 106 and 107, and the egress RBridge would be RBridge 105. The incoming frames forwarded by switch 114 would have either RBridge 106 or RBridge 107 marked as their ingress RBridge ID. When RBridge 105 receives these frames and performs MAC address learning, RBridge 105 would assume that the host is moving and is either coupled to RBridge 106 or RBridge 107 (but not both). RBridge 105 would send the frames from end station 111 to either RBridge 106 or RBridge 107. Consequently, only one of the physical links leading to switch 114 is used, which defeats the purpose of having redundant links between switch 114 and RBridges 106 and 107.

Figure 1B:
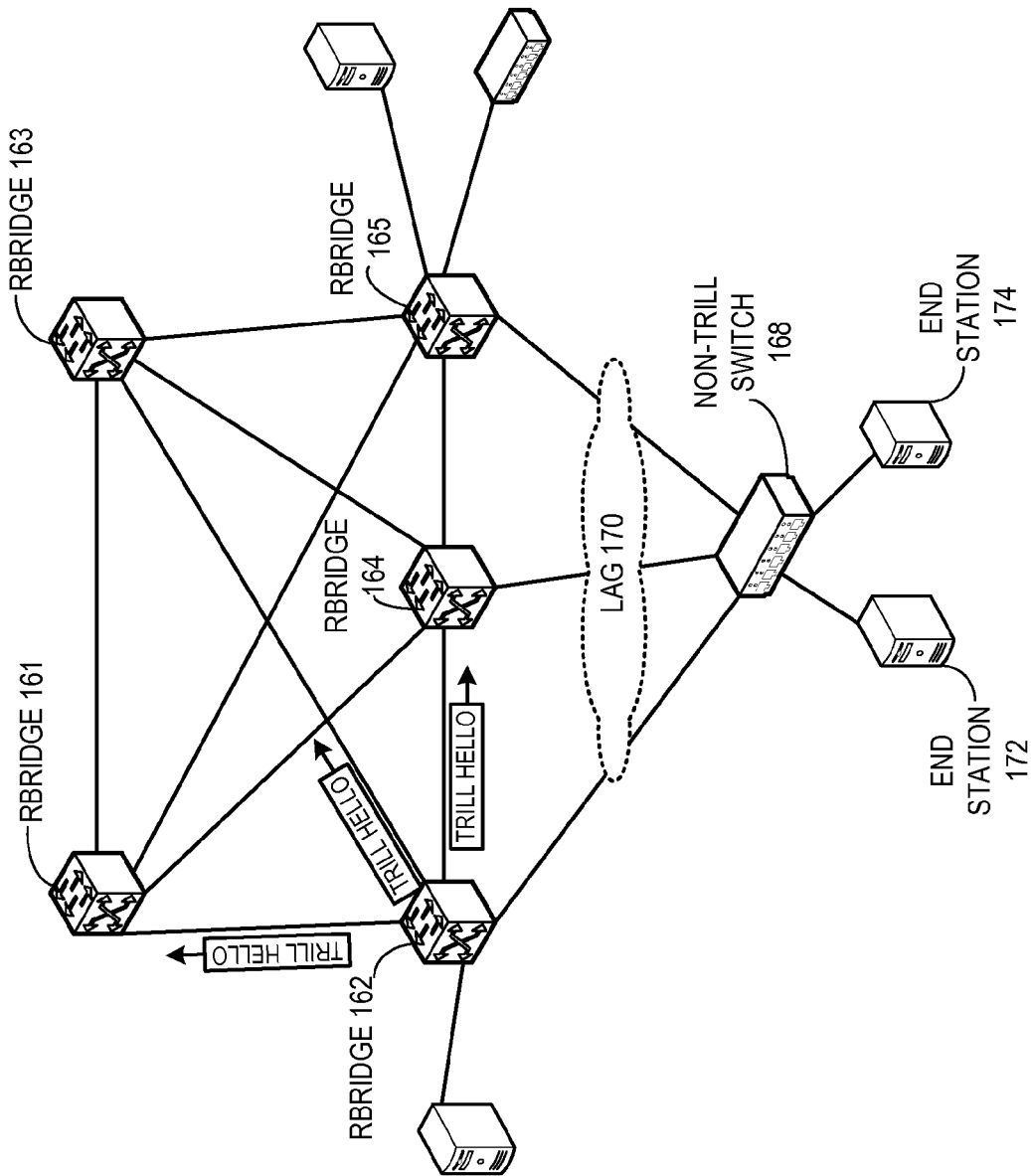
FIG. 1B illustrates an exemplary network that facilitates virtual RBridge identifier assignment to a non-TRILL node coupled to multiple TRILL RBridges via link aggregation, in accordance with an embodiment of the present invention.

The multi-homing configuration of an end station is explained in more detail in the example illustrated in FIG. 1B. In this example, the TRILL network includes five physical RBridges: 161, 162, 163, 164, and 165. A non-TRILL switch 168 is coupled to RBridges 162, 164, and 165, and end stations 172 and 174. During operation, a virtual RBridge identifier is assigned to non-TRILL switch 168, either manually or automatically by one of the coupled RBridges using Link Layer Discovery Protocol (LLDP) or any other configuration/discovery protocol.

Non-TRILL switch 168 has its links to RBridges 162, 164, and 165 configured as a link aggregation (LAG) 170. In other words, switch 168 can distribute ingress traffic (i.e., traffic from end stations 172 and 174 to the TRILL network) among the three links using link aggregation techniques. Such techniques can include any multi-chassis trunking techniques. In addition, RBridges 162, 164, and 165 are configured to process ingress frames from switch 168 such that these frames will have the virtual RBridge nickname in their TRILL header as the ingress RBridge. When these frames are forwarded to the rest of the TRILL network with their respective TRILL headers, other RBridges in the network treat them as being originated from the virtual RBridge.

During operation, each physical RBridge sends TRILL HELLO messages to its neighbor to confirm its health. Each RBridge also sends link state protocol data units (LSPs) to its neighbor, so that link state information can be exchanged and propagated throughout the TRILL network. As illustrated in FIG. 1B, RBridge 162 regularly transmits TRILL HELLO messages to its neighboring RBridges. Since switch 168 is not TRILL enabled, RBridge 162 does not send TRILL HELLO messages to switch 168. In addition, RBridge 162 has a static link state entry for the virtual RBridge associated with switch 168, and periodically announces the reachability to this virtual RBridge in its LSPs to other RBridges. Similarly, RBridges 164 and 165 also maintain static link state entries for the virtual RBridge and announce its reachability in their respective LSPs.

In a TRILL network, the reachability information associated with a MAC address is learned by an RBridge based on the source MAC address in the internal Ethernet header of a received TRILL frame. It is possible that the three RBridges coupled to switch 168 may learn different MAC reachability information about the end stations behind switch 168. To avoid unnecessary flooding (which is the default behavior of a layer-2 switch when it encounters a frame with a destination MAC address that it does not know how to forward), in one embodiment, the MAC address reachability for end stations 172 and 174 via switch 168 is shared among all the RBridges coupled to switch 168. That is, RBridges 162, 164, and 165 share the MAC reachability information of the devices behind switch 168. For example, assume that RBridge 162 receives all the frames originated from end station 172, while RBridge 164 receives all the frames originated from end station 174. RBridge 162 then shares its knowledge about the MAC of end station 172 (i.e., the knowledge that the MAC address for end station 172 is associated with the virtual RBridge and that end station 172 is behind switch 168) with RBridges 164 and 165. Similarly, RBridge 164 shares its knowledge about end station 174's MAC address with RBridges 162 and 165. This way, when a frame destined for, say, end station 172 reaches RBridge 165, RBridge 165 would know that it can forward the frame to switch 168, instead of flooding it to multiple ports.

It should be noted that a non-TRILL switch (such as switch 168) is not required to change the way it is configured for handling link aggregation. A multi-homed end station only needs to be configured as would be the case with a regular link aggregation scheme. Hence, the multi-homed end station does not need to be aware that a virtual RBridge nickname is assigned to all the frames it forwards to the physical RBridge(s). Furthermore, the rest of the TRILL network (apart from RBridges 163, 164, and 165) is also not required to be aware that the virtual RBridge is actually not a physical RBridge. In other words, to the rest of the TRILL network, the virtual RBridge associated with switch 168 is indistinguishable from any of the physical RBridges. Therefore, the present invention does not require extra configuration to the rest of the TRILL network.

Frame Processing

Figure 2:
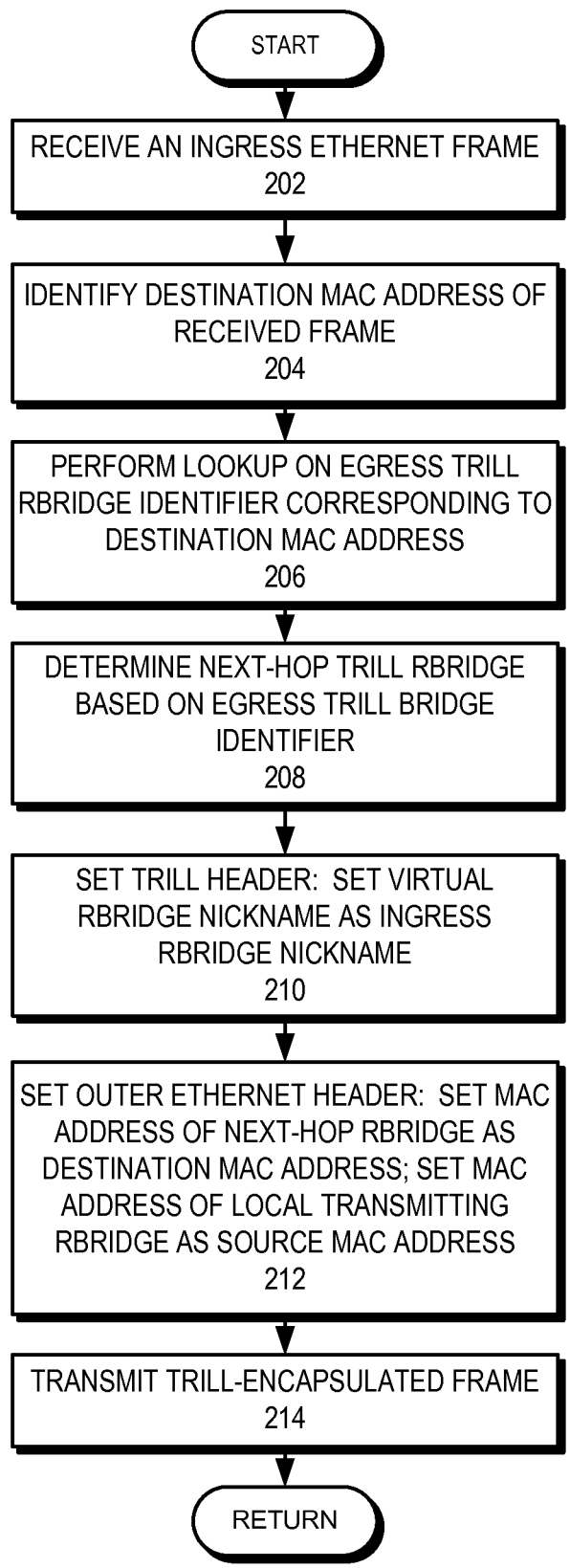
FIG. 2 presents a flowchart illustrating the process of configuring the TRILL header of an ingress frame from a non-TRILL node at an ingress physical RBridge, in accordance with an embodiment of the present invention.

FIG. 2 presents a flowchart illustrating the process of configuring the TRILL header of an ingress frame from a non-TRILL node at an ingress physical RBridge, in accordance with an embodiment of the present invention. During operation, a physical RBridge participating in link aggregation receives an ingress Ethernet frame from a non-TRILL switch which has been assigned a virtual RBridge identifier (operation 202). The RBridge then identifies the destination MAC address of the received frame (operation 204). Based on the destination MAC address, the RBridge performs a lookup on the egress TRILL RBridge nickname (operation 206). Next, the RBridge determines the next-hop TRILL RBridge based on the egress TRILL RBridge nickname (operation 208). (It is assumed that the routing function in the TRILL protocol or other routing protocol is responsible for populating the forwarding information base at each RBridge.)

Subsequently, the RBridge sets the TRILL header of the frame (operation 210). In doing so, the RBridge sets the virtual RBridge as the ingress RBridge for the frame. The egress RBridge of the TRILL header is set based on the result of operation 206.

The RBridge then sets the outer Ethernet header of the frame (operation 212). In doing so, the RBridge sets the MAC address of the next-hop RBridge (the result of operation 208) as the destination MAC address in the outer Ethernet header. The RBridge further sets the MAC address of the local transmitting RBridge as the source MAC address in the outer Ethernet header. After setting the outer Ethernet header, the RBridge transmits the TRILL-encapsulated frame to the next-hop RBridge (operation 214).

Figure 3:
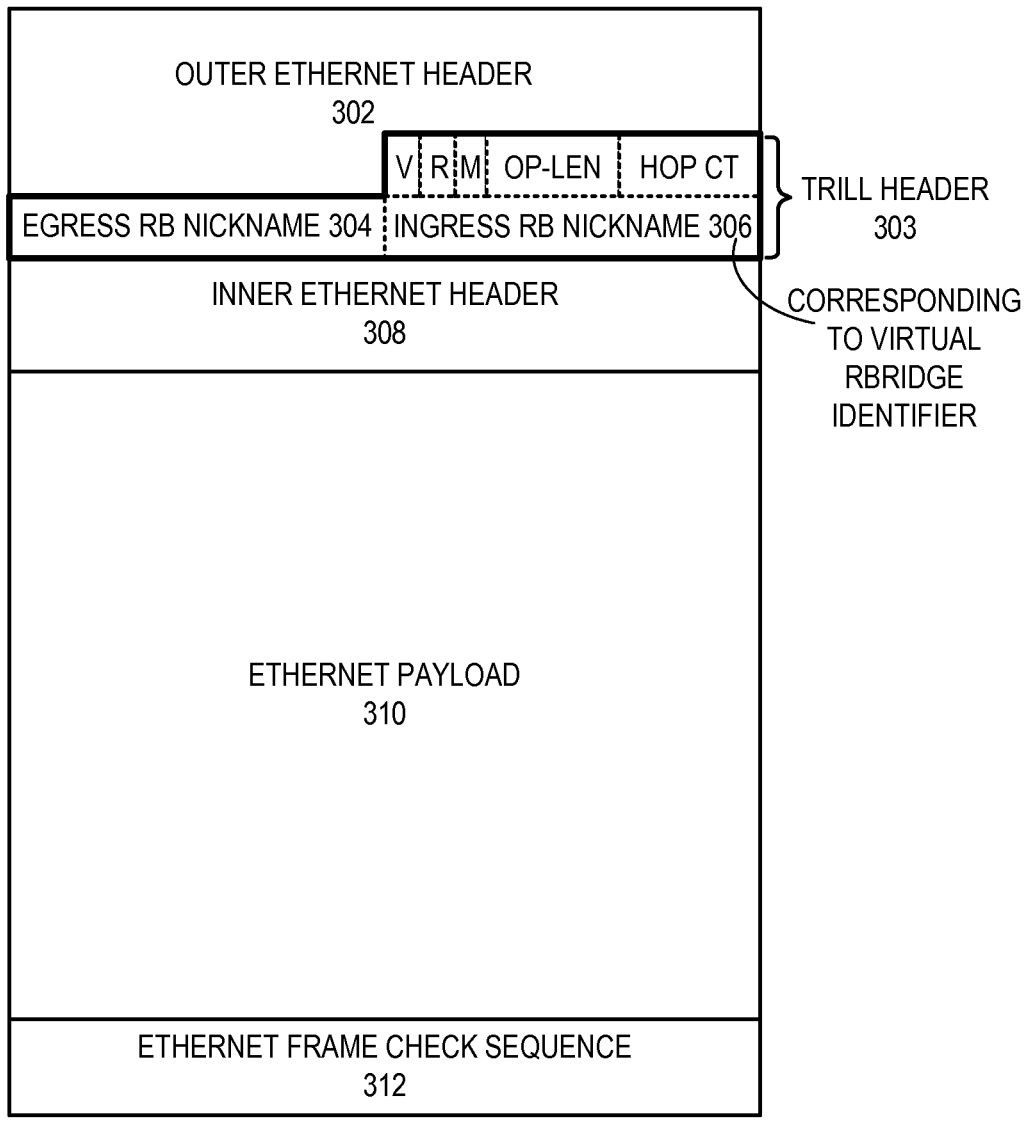
FIG. 3 illustrates an exemplary header configuration of an ingress TRILL frame which contains a virtual RBridge nickname in its ingress RBridge nickname field, in accordance with an embodiment of the present invention.

FIG. 3 illustrates an exemplary header configuration of an ingress TRILL frame which contains a virtual RBridge nickname in its ingress RBridge nickname field, in accordance with an embodiment of the present invention. In this example, a TRILL-encapsulated frame includes an outer Ethernet header 302, a TRILL header 303, an inner Ethernet header 308, an Ethernet payload 310, and an Ethernet frame check sequence (FCS) 312.

TRILL header 303 includes a version field (denoted as "V"), a reserved field (denoted as "R"), a multi-destination indication field (denoted as "M"), an option-field-length indication field (denoted as "OP-LEN"), and a hop-count field (denoted as "HOP CT"). Also included are an egress RBridge nickname field 304 and an ingress RBridge nickname field 306.

Figure 4:
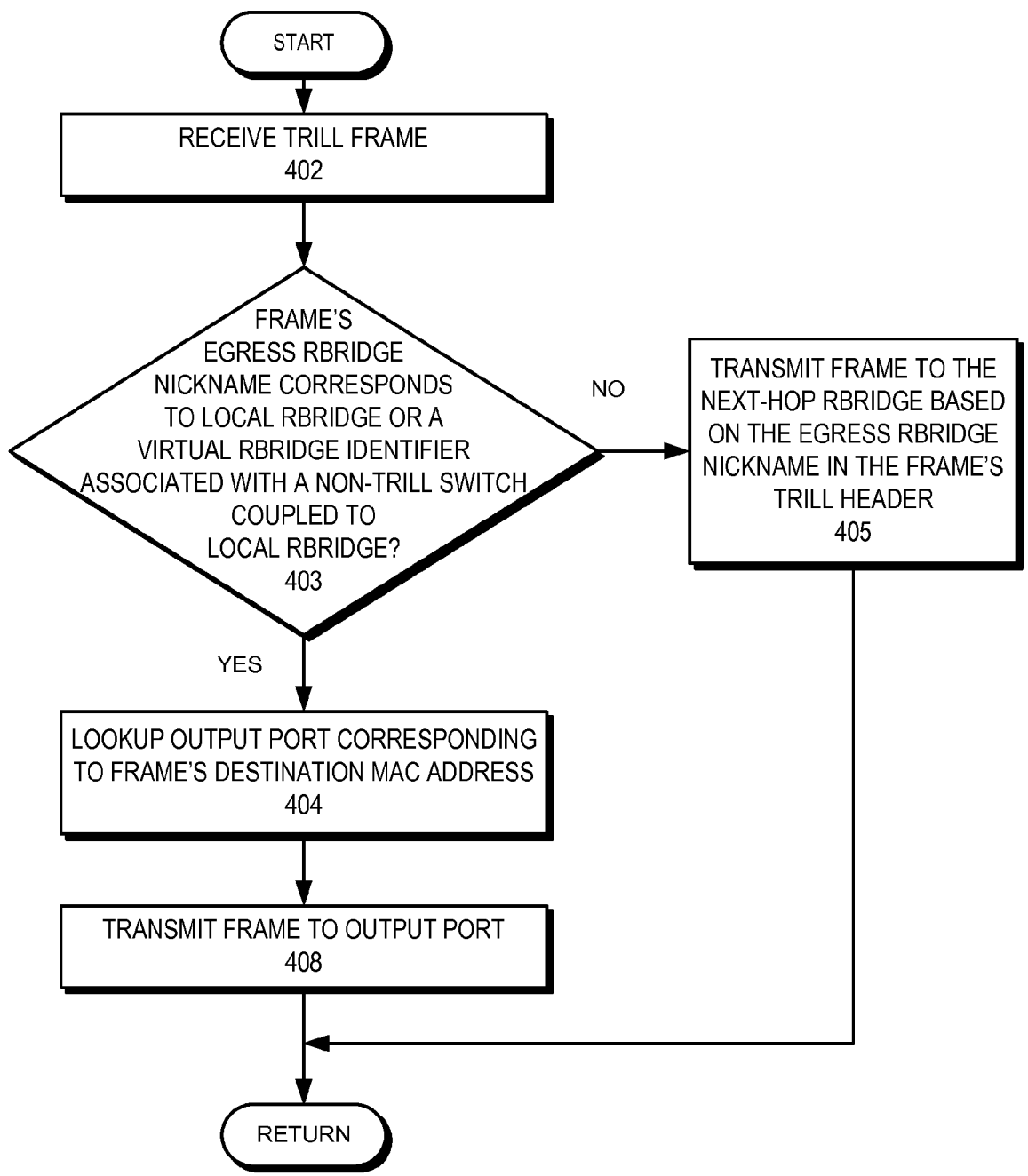
FIG. 4 presents a flowchart illustrating the process of forwarding a TRILL frame at an ingress RBridge which participates in the link aggregation in conjunction with a non-TRILL node which has a virtual RBridge ID, in accordance with an embodiment of the present invention.

After an ingress physical RBridge encapsulates an ingress frame with the proper TRILL and outer Ethernet headers and transmits the frame to its destination, it is expected to receive frames in the reverse direction from the destination in response to the transmission. FIG. 4 presents a flowchart illustrating the process of receiving and forwarding a TRILL frame at a physical RBridge which participates in the link aggregation in conjunction with a non-TRILL node which has a virtual RBridge ID, in accordance with an embodiment of the present invention.

During operation, a physical RBridge receives a TRILL frame (operation 402). The RBridge then determines whether the frame's egress RBridge nickname corresponds to the local RBridge or a virtual RBridge associated with the local RBridge (operation 403). If the frame's egress RBridge nickname matches neither the local RBridge nor a virtual RBridge identifier associated with a non-TRILL switch coupled to the local RBridge (i.e., the frame is not destined to the local RBridge), the RBridge transmits the frame to the next-hop RBridge based on the frame's egress RBridge nickname (operation 405).

On the other hand, if the condition in operation 403 is met, the RBridge then performs a lookup in its MAC-address table to identify an output port corresponding to the frame's destination MAC address in its inner Ethernet header (operation 404). In the case where the frame's destination MAC address corresponds to an end station coupled to the local RBridge, the frame is processed locally. If the frame's destination MAC address corresponds to an output port leading to the non-TRILL switch coupled to the local RBridge, the local RBridge removes the outer Ethernet header and TRILL header from the frame, and forwards the frame to the identified output port leading to the non-TRILL switch. Note that the MAC reachability information is shared between the RBridges participating in the link aggregation. Hence, even if the local RBridge has not received an ingress frame with the same source MAC address (i.e., the RBridge has not learned the MAC address locally), the RBridge can still determine that the destination MAC address is reachable via a local link based on the MAC reachability information shared from the other RBridge(s). Subsequently, the RBridge transmits the frame to the output port corresponding to the frame's destination MAC address in its inner Ethernet header (operation 408).

Failure Handling

Figure 5:
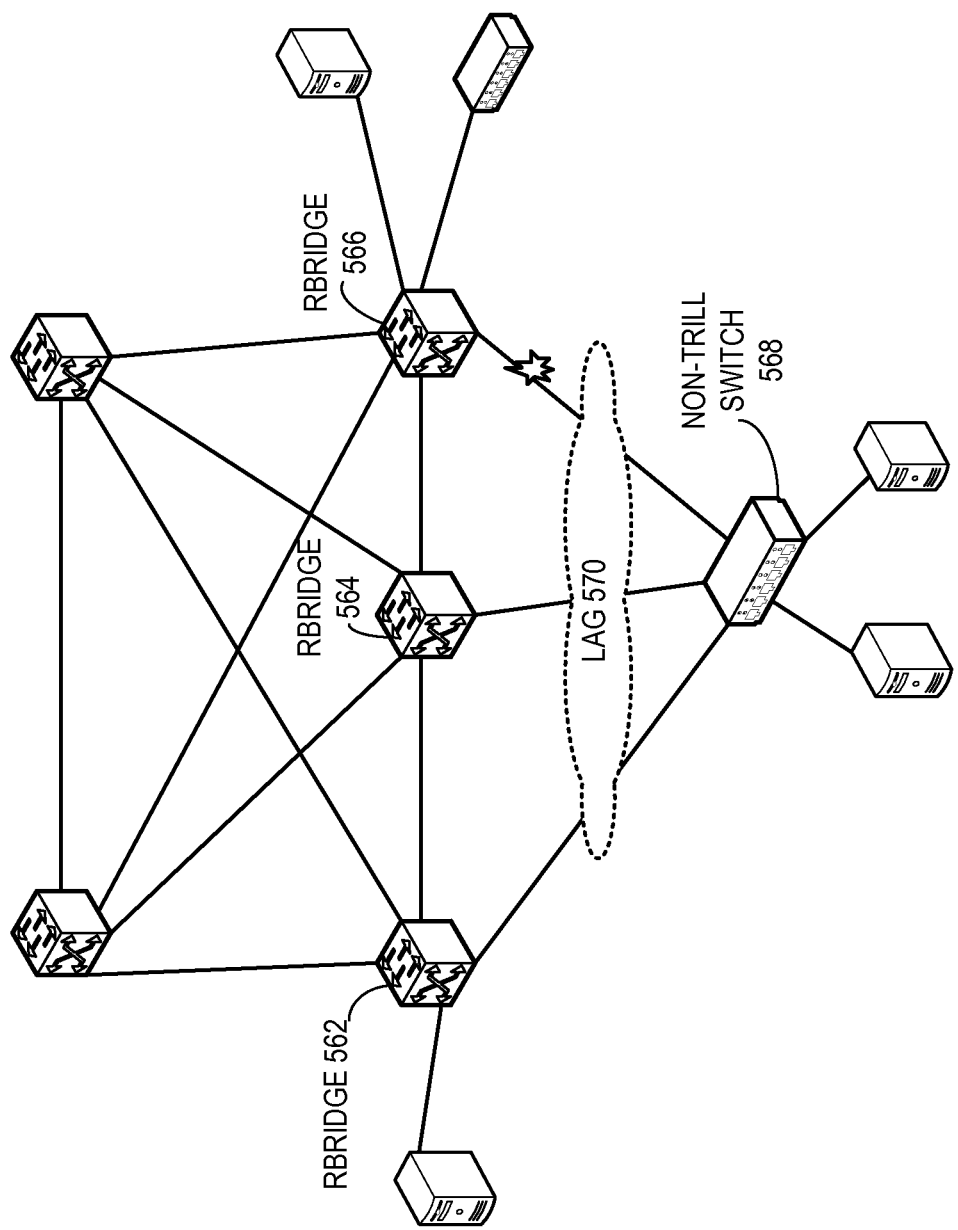
FIG. 5 illustrates a scenario where one of the physical links of a link aggregation coupled to a non-TRILL node experiences a failure, in accordance with an embodiment of the present invention.

One advantage of assigning a virtual RBridge identifier to a non-TRILL switch is to facilitate link aggregation across multiple physical RBridges, which in turn provides protection against both link and node failures. FIG. 5 illustrates a scenario where one of the physical links of a link aggregation coupled to a non-TRILL node experiences a failure, in accordance with an embodiment of the present invention. In this example, a non-TRILL switch 568 is coupled to three physical RBridges 562, 564, and 566 via a link aggregation 570. Non-TRILL switch 568 is assigned a virtual RBridge ID. Suppose the link between switch 568 and RBridge 566 fails. As a result, RBridge 566 will notify its neighbor RBridges about the non-reachability of switch 568. Meanwhile, LAG 570 remains effective with RBridges 562 and 564. Switch 568's virtual RBridge nickname can still be used as the ingress RBridge nickname in the TRILL headers of its ingress frames.

RBridge 566 may still receive some frames destined to switch 568 before the TRILL network topology converges. Since RBridges 562 and 564 can both be used to reach switch 568, RBridge 566 can forward these frames to RBridge 562 or 564. Thus, minimum service interruption can be achieved during link failure. Similarly, in the case of node failure (e.g., when RBridge 566 fails), switch 568 can continue operation with LAG 570.

Figure 6:
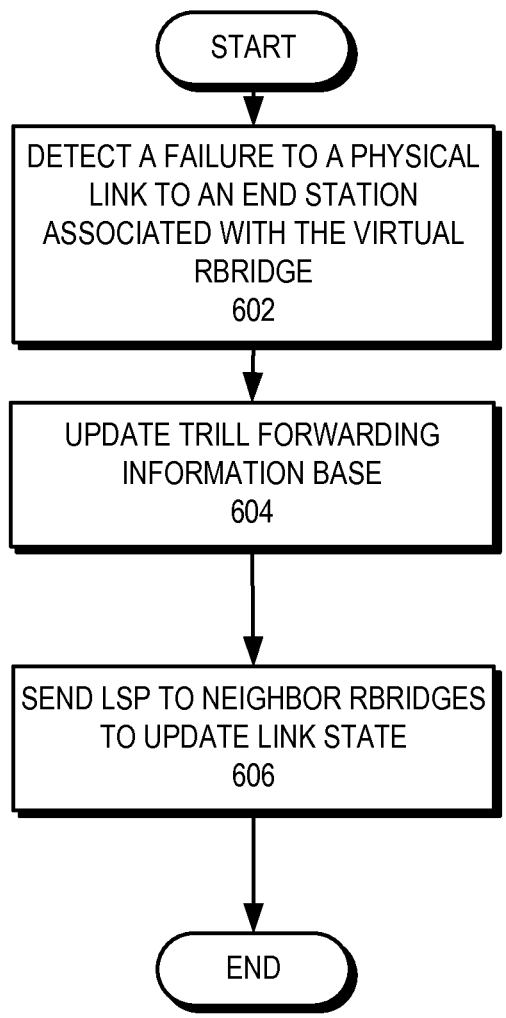
FIG. 6 presents a flowchart illustrating the process of handling a link failure that affects an end station which is assigned a virtual RBridge ID, in accordance with an embodiment of the present invention.

FIG. 6 presents a flowchart illustrating the process of handling a link failure that affects an end station which is assigned a virtual RBridge ID, in accordance with an embodiment of the present invention. During operation, a physical RBridge detects a failure to a physical link to an end station associated with the virtual RBridge (operation 602). The physical RBridge then updates its TRILL forwarding information base to reflect this topology change (604). Subsequently, the RBridge sends link state PDUs to its neighbor RBridges to update the link state (operation 606). Note that the non-TRILL end station corresponding to the virtual RBridge identifier does not need to be re-configured. It only needs to re-distribute the outgoing frames to the remaining links within the LAG coupling to other physical RBridges.

Multi-Destination Scenario

In conventional TRILL networks, a multi-destination frame is delivered using one or more distribution trees. Each tree has a root RBridge. Typically, an ingress RBridge marks a multi-destination TRILL frame's egress RBridge nickname field with the nickname of the root RBridge for the distribution tree, and sets the M bit of the frame to "1." As a result, the frame is distributed through the TRILL network based on a TREE topology associated with the root RBridge.

It is possible that a multi-destination frame is generated by a non-TRILL switch which is coupled to a number of physical RBridges and is assigned a virtual RBridge identifier. Since the non-TRILL switch is regarded as an RBridge by the rest of the TRILL network, its virtual RBridge identifier will be included in the distribution trees. Take the network illustrated in FIG. 1B for example. A distribution tree can have RBridge 162 as its root. The tree can include the following links: (162, 164), (162, 161), (162, 163), (163, 165), (165, 168). In this case, since non-TRILL switch 168 does not follow the TRILL multi-destination distribution protocol, when it forwards a multi-destination frame (which may be generated by end station 172 or 174), its default behavior is to send the frame onto one of the links within LAG 170. The link used by non-TRILL switch 168 may or may not be part of the desired distribution tree. This default behavior, if not mitigated, could cause unwanted loops in the network. For instance, suppose non-TRILL switch 168 sends a multi-destination frame onto the link toward RBridge 164. Since RBridge 165 is adjacent to RBridge 164 in the distribution tree, RBridge 164 would forward this frame to RBridge 165. Upon receiving this frame, RBridge 165 would by default forward it non-TRILL switch 168, which is part of the distribution tree. As a result, a loop occurs.

One way to solve this looping problem is to provide proper encapsulation at the ingress physical RBridge (such as RBridges 162, 164, and 165). In one embodiment, at the ingress physical RBridge, the multi-destination frame is encapsulated with a multi-destination TRILL header whose M bit is set to "1." In this TRILL header, the ingress RBridge nickname field contains the virtual RBridge nickname assigned to non-TRILL switch 168. The egress RBridge nickname field contains the nickname of RBridge 162, which is the root of the distribution tree. The ingress physical RBridge can then forward this frame on behalf of non-TRILL switch 168. In addition, when a physical RBridge receives a multi-destination frame with an ingress RBridge nickname matching the virtual RBridge nickname assigned to a non-TRILL switch connected to the physical RBridge, the physical RBridge is precluded from forwarding this frame to the non-TRILL network. For example, in the scenario described above, RBridge 165 would be precluded from forwarding the multi-destination frame to non-TRILL switch 168, because the frame's ingress RBridge nickname is the same as the virtual RBridge nickname assigned to non-TRILL switch 168. This constraint ensures that no loop can occur from these multi-destination frames.

Exemplary Switch System

Figure 7:
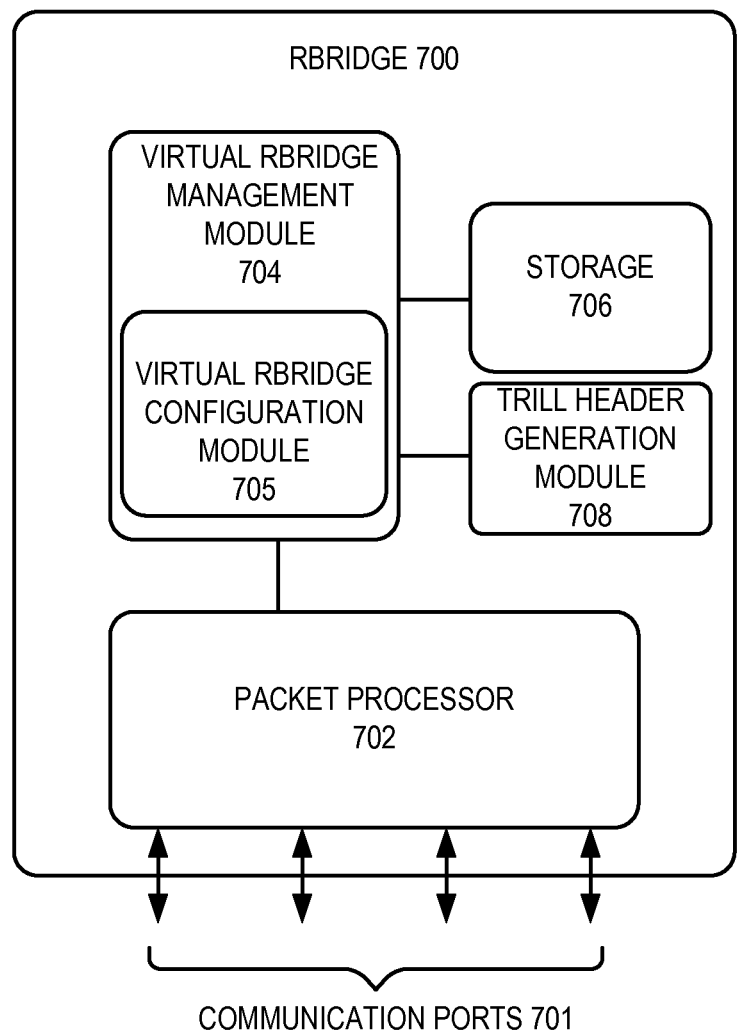
FIG. 7 illustrates an exemplary architecture of a switch that facilitates assignment of a virtual RBridge ID, in accordance with an embodiment of the present invention.

FIG. 7 illustrates an exemplary architecture of a switch that facilitates assignment of a virtual RBridge ID, in accordance with an embodiment of the present invention. In this example, a RBridge 700 includes a number of communication ports 701, a packet processor 702, a virtual RBridge management module 704, a virtual RBridge configuration module 705, a storage device 706, and a TRILL header generation module 708. During operation, communication ports 701 receive frames from (and transmit frames to) the end stations. Packet processor 702 extracts and processes the header information from the received frames. Note that communication ports 701 include at least one inter-switch port for communication with one or more RBridges participating in a link aggregation. Virtual RBridge management module 704 manages the communication with the partner RBridges and handles various inter-switch communication, such as MAC address information sharing and link failure notification.

Virtual RBridge configuration module 705 allows a user to configure and assign the identifier for the virtual RBridges. It is also responsible for communicating with the partner RBridge(s) to share each other's MAC address reachability information, which is stored in storage 706. Furthermore, TRILL header generation module 708 generates the TRILL header for ingress frames corresponding to the virtual RBridge.

In summary, embodiments of the present invention provide a method and system for facilitating link aggregation or diverse connections to different networks across different switches in a routed network. In one embodiment, a virtual RBridge is formed to accommodate an aggregate link from an end station to multiple physical RBridges. The virtual RBridge is used as the ingress RBridge for ingress frames from the end station. Such configuration provides a scalable and flexible solution to link aggregation across multiple switches.

The methods and processes described herein can be embodied as code and/or data, which can be stored in a computer-readable nontransitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:
1. A switch, comprising:
a processor;
a storage device coupled to the processor and storing instructions which when executed by the processor cause the processor to perform a method, the method comprising:
generating a virtual routing node identifier for a non-routing node, wherein the virtual routing node identifier indicates a multi-switch link aggregation;
constructing a frame comprising reachability information corresponding to the virtual routing node identifier;
marking an ingress-node field of a frame received from the non-routing node with the virtual routing node identifier; and
precluding a received multi-destination frame from being forwarded to the non-routing node when an ingress-node field of the multi-destination frame matches the virtual routing node identifier, thereby avoiding duplication of the multi-destination frame.

2. The switch of claim 1, wherein the switch is configured to route layer-2 data frames without requiring the network topology to be a spanning tree topology.

3. The switch of claim 1, wherein the virtual routing node identifier is a routing bridge identifier in accordance with a Transparent Interconnection of Lots of Links (TRILL) protocol.

4. The switch of claim 1, wherein the method further comprises communicating to a second switch which is part of the multi-switch link aggregation a MAC address learned from a port to which the non-routing node is coupled.

5. The switch of claim 1, wherein in response to detecting a failure of a link between the non-routing node and the switch, the method further comprises discontinuing communicating reachability information to another switch of the multi-switch link aggregation.

6. A non-transitory storage device storing instructions which when executed by a processor cause the processor to perform a method, comprising:
   generating, at a switch, a virtual routing node identifier for a non-routing node, wherein the virtual routing node identifier indicates a multi-switch link aggregation;
   constructing a frame comprising reachability information corresponding to the virtual routing node identifier;
   marking an ingress-node field of a frame received from the non-routing node with the virtual routing node identifier; and
   precluding a received multi-destination frame from being forwarded to the non-routing node when an ingress-node field of the multi-destination frame matches the virtual routing node identifier, thereby avoiding duplication of the multi-destination frame.

7. The non-transitory storage device of claim 6, wherein the method further comprises routing layer-2 data frames without requiring the network topology to be a spanning tree topology.

8. The non-transitory storage device of claim 6, wherein the virtual routing node identifier is a routing bridge identifier in accordance with a Transparent Interconnection of Lots of Links (TRILL) protocol.

9. The non-transitory storage device of claim 6, wherein the method further comprises communicating to a second switch which is part of the multi-switch link aggregation a MAC address learned from a port to which the non-routing node is coupled.

10. The non-transitory storage device of claim 6, wherein in response to detecting a failure of a link between the non-routing node and the switch, the method further comprises discontinuing communicating reachability information to another switch of the multi-switch link aggregation.

11. A switch, comprising:
    a virtual-node-management module configured to:
        store a virtual routing node identifier for a non-routing node, wherein the virtual routing node identifier indicates a multi-switch link aggregation;
        construct a frame comprising reachability information corresponding to the virtual routing node identifier; and
        mark an ingress-node field of a frame received from the non-routing node with the virtual routing node identifier; and
    a packet processor coupled to the virtual-node-management module and precluded from forwarding a received multi-destination frame to the non-routing node when an ingress-node field of the multi-destination frame matches the virtual routing node identifier, thereby avoiding duplication of the multi-destination frame.

12. The switch of claim 11, further comprising a routing mechanism coupled to the virtual-node-management module and configured to route layer-2 data frames without requiring the network topology to be a spanning tree topology.

13. The switch of claim 11, wherein the virtual routing node identifier is a routing bridge identifier in accordance with a Transparent Interconnection of Lots of Links (TRILL) protocol.

14. The switch of claim 11, wherein the virtual-node-management module is further configured to communicate to a second switch which is part of the multi-switch link aggregation a MAC address learned from a port to which the non-routing node is coupled.

15. The switch of claim 11, wherein the virtual-node-management module is configured to discontinue communicating reachability information to another switch of the multi-switch link aggregation in response to detecting a failure of a link between the non-routing node and the switch.

* * * * *